United States Patent [19]
Pokhis

[11] Patent Number: 5,487,408
[45] Date of Patent: Jan. 30, 1996

[54] WATER SINK SYSTEM

[76] Inventor: Naum Pokhis, 1132 S. Doheny, Los Angeles, Calif. 90035

[21] Appl. No.: 346,870

[22] Filed: Nov. 30, 1994

[51] Int. Cl.$^6$ ............................................. F16K 11/18
[52] U.S. Cl. ................................. 137/556.3; 137/606
[58] Field of Search ....................... 137/556.3, 556.6, 137/606

[56] References Cited

U.S. PATENT DOCUMENTS

| | | | |
|---|---|---|---|
| 413,923 | 10/1889 | Blanchard | 137/556.3 X |
| 3,542,042 | 11/1970 | Buechner | 137/556.3 X |
| 3,664,372 | 5/1972 | Marshall | 137/556.6 X |
| 5,170,816 | 12/1992 | Schnieders | 137/556.6 |

*Primary Examiner*—Stephen M. Hepperle
*Attorney, Agent, or Firm*—Ilya Zborovsky

[57] ABSTRACT

A water sink system, comprising a water discharge member, two rotatable knobs for allowing hot water and cold water to flow into the water discharge member and meet there to produce discharged water with a desired temperature, a scale provided near each of the turnable knobs and having a plurality of graduation marks, and a pointer provided on each of the turnable knobs and turnable with the latter, so that when a user by turning the turnable knobs reaches a desired temperature, each pointer points to a respective graduation mark of each scale, with graduation marks can be memorized by a user and thereafter he can turn the knobs immediately to the memorized graduation marks.

1 Claim, 2 Drawing Sheets

WATER SINK SYSTEM

BACKGROUND OF THE INVENTION

The present invention relates to water sink systems.

It is known that water sink systems include a sink and usually two turning knobs for hot water and cold water.

In order to adjust the temperature of the water which the user needs for each particular use, the user opens the turning knob of hot water and opens the turning knob of cold water and performs many manipulations until he reaches the desired temperature. During this process a lot of water is actually wasted. In view of the modern trend to save water it is therefore very important to improve the existing systems so as to economize as much water as possible.

SUMMARY OF THE INVENTION

Accordingly, it is an object of the present invention to provide a water sink system which avoids the disadvantages of the prior art.

In keeping with these objects and with others which will become apparent hereinafter, one feature of the present invention resides, briefly stated, in a water sink system which has a sink, a water discharge member, a turning knob for hot water and a turning knob for cold water turnable about their axes, a scale arranged near each turning knob, and a pointer mounted on each turning knob so that during of the turning knobs the pointer points to a corresponding graduation line of the scale.

When the water sink system is designed in accordance with the present invention, a user turns the turning knob of the cold water and the turning knob of the hot water and adjusts for himself the desired temperature of the combined stream. When the desired temperature is reached, the user memorizes the graduation lines on the scales associated with both turning knobs. During subsequent uses, he will immediately turn the turning knobs so that their pointers reach the memorized graduation lines and therefore obtains a desired temperature at once without experimentation and turning the turning knobs back and forth as in conventional water sink systems. Thus, a substantial quantity of water is saved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
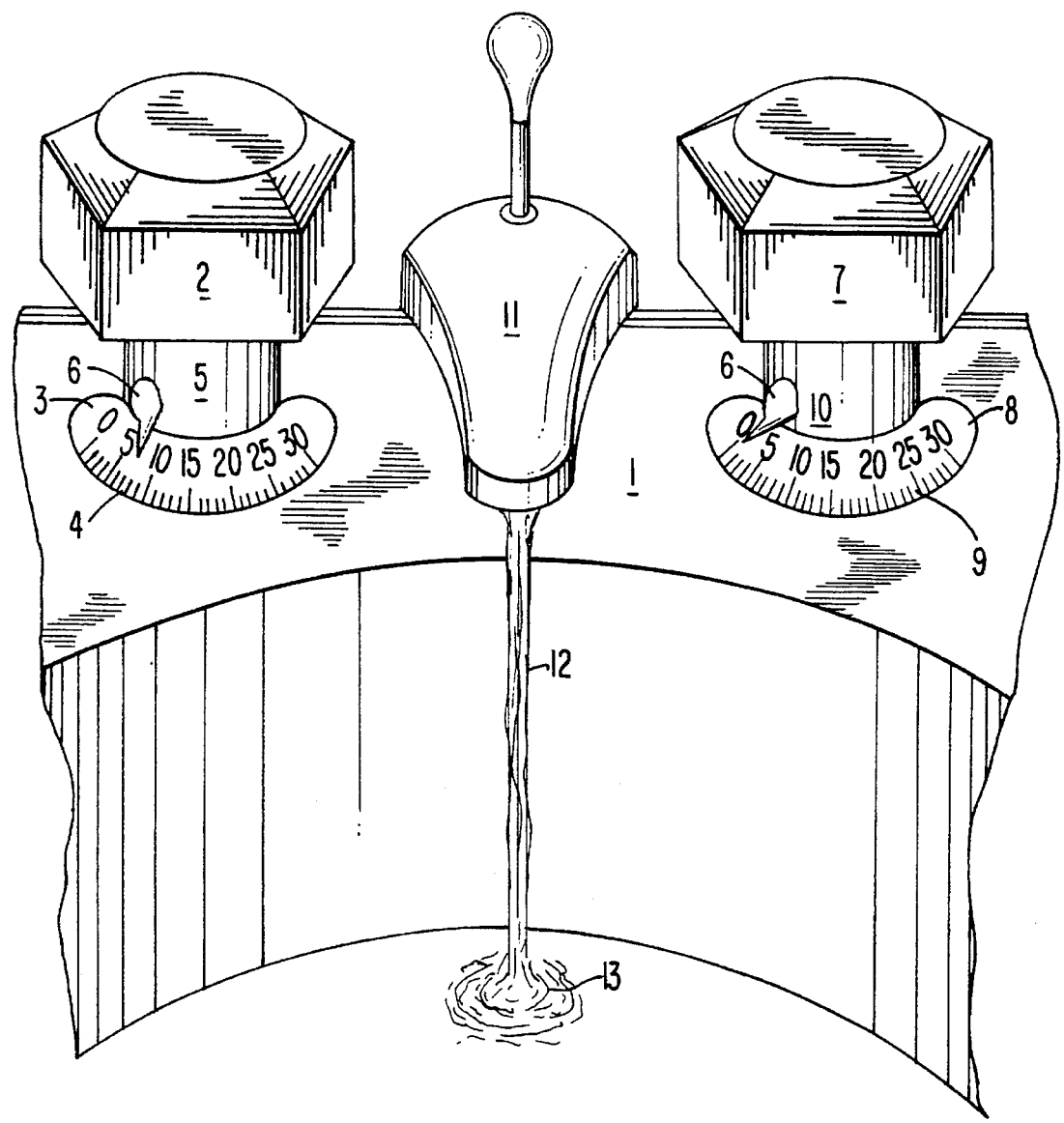
FIG. 1 is a view showing a water sink system in accordance with the present invention.

A water sink system in accordance with the present invention has a turning knob 2 for hot water and a turning knob 7 for cold water. A water discharge element 11 discharges a water stream 12 into a drainage opening 13 of the sink, and the temperature of discharged water is regulated by turning of the knobs 2 and 7 correspondingly.

In accordance with the present invention, each turning knob is provided with a pointer 6 attached to a turnable element 5 of the knob. On the upper surface of the sink plate 1, scales 3 and 8 with graduation marks 4 and 9 correspondingly are arranged near each turning knob. The scales are arc-shaped.

When a user wants to use water with a certain temperature, he turns the turning knobs 2 and 7 for cold water and hot water by corresponding angles so that the water with the desired temperature discharges through the element 11. During turning of the knobs 2 and 7 the pointers 6 are turned as well as point to certain graduation marks 4 and 9 of the scales 3 and 8. In this position the user is satisfied with a temperature of the water. He memorizes the graduations on each of the scales, and during subsequent use when he needs the same temperature of the water he turns the turning knobs 2 and 7 so that their pointers 6 and 10 immediately reach the selected graduation marks. Thus, no experimentation is needed for subsequent use of the water sink system.

Figure 2:
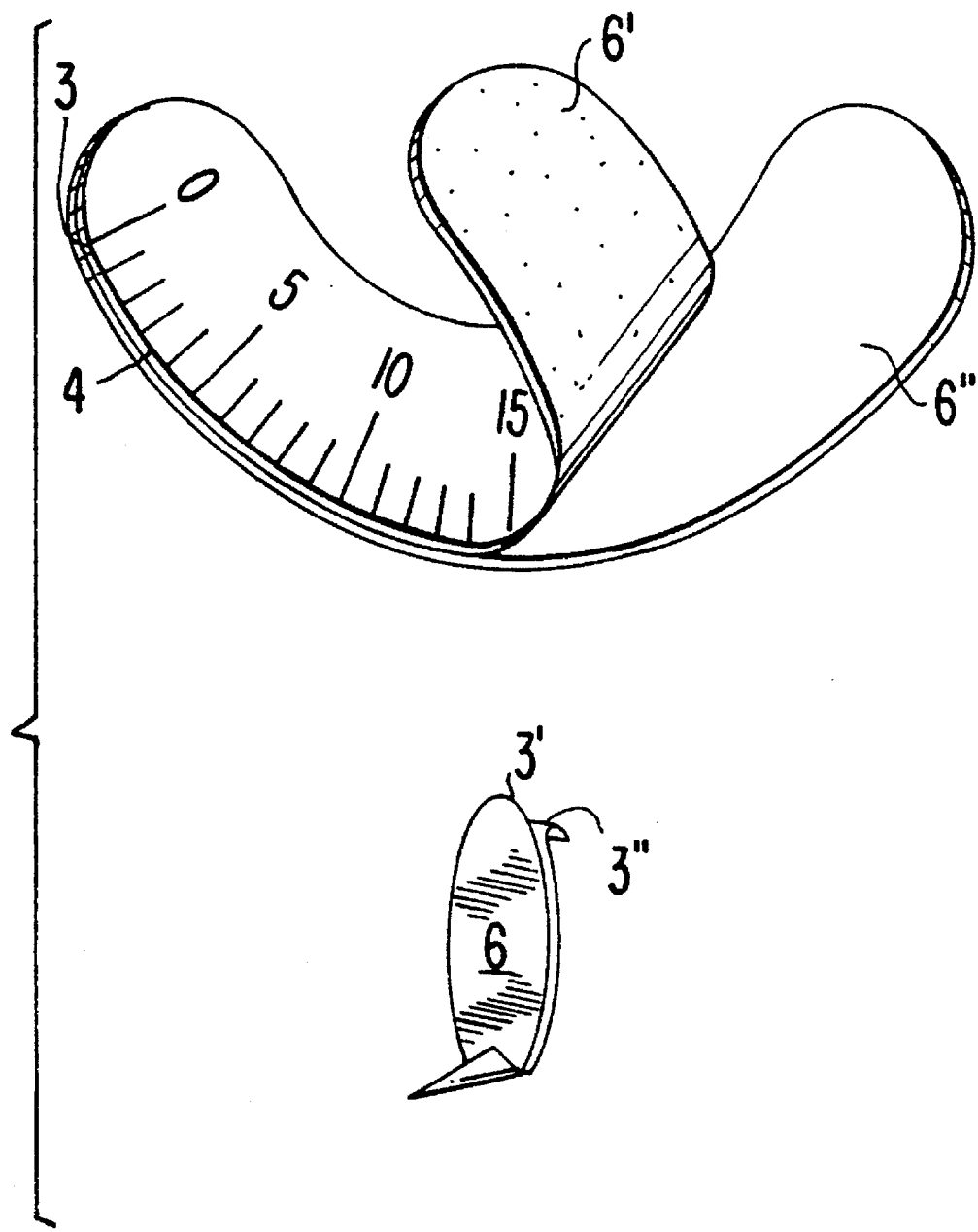
FIG. 2 is a view showing a modification of the elements of the inventive system.

A simplified construction of the scales and the pointers which is easy to install on the existing water sink systems is shown in FIG. 2. Here, the pointer 6' has a substantially horizontal pointed part and a substantially vertical arcuate part which can surround the turning part 5 of each knob. The inner surface of the arcuate part is provided with an adhesive layer 6" which can be covered as well known by a not shown protective layer. On the other hand, the scale 3' is also provided with an adhesive layer 3" which also can be covered by a protective layer. In order to install the pointer and the scale in the system the protective layer is removed and the pointer is pressed by its adhesive layer 6" against the turning part 5 of each knob and is attached to it. The protective layer is removed from the adhesive layer 3" of each scale, and the scale 3' is pressed against the upper surface of the supporting plate 1 of the sink so as to be fixed to it.

It is of course possible to attach the scales in a different way, for example on separate supports.

The pointers shown in FIG. 1 each have a point part and a ring-shaped part which is fitted over a turning part of each of the knobs. The position of each pointer can be adjusted by unscrewing a screw which fixes each of the knobs, turning the pointer with its ring-shaped part around the turning part of each knob, and then screwing in the screw again.

It will be understood that each of the elements described above, or two or more together, may also find a useful application in other types of constructions differing from the types described above.

While the invention has been illustrated and described as embodied in a water sink system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A water sink system, comprising a water discharge member; two rotatable knobs for allowing hot water and cold water to flow into the water discharge member and meet there to produce discharged water with a desired temperature; a scale provided near each of the turnable knobs and having a plurality of graduation marks; and a pointer provided on each of said turnable knobs and turnable with the latter, so that when a user by turning the turnable knob reaches a desired temperature, each pointer points to a respective graduation mark of each scale, which graduation marks can be memorized by a user and thereafter he can turn said knobs immediately to the memorized graduation marks, so that the hot water and the cold water are mixed correspondingly and mixed water is discharged from said water discharge member with a desired temperature, each of said scales having a lower surface provided with an adhesive layer so that each of said scales can be attached to a supporting element of the water sink system by said adhesive layer, each of said pointers having a substantially horizontal pointed part and a substantially vertical arced part, said substantially vertical arced part being of one piece with said substantially horizontal pointed part and surrounding a turning part of each of said knobs, said substantially vertical arced part of each of said pointers having an inner surface provided with an adhesive layer so that each of said pointers can be attached to said turning part of a respective one of said knobs by aid adhesive layer provided on said inner surface of said arced point of each of said pointers.

* * * * *